H. SCHUMACHER.
STEERING GEAR FOR VEHICLES.
APPLICATION FILED AUG. 12, 1911.

1,030,793.

Patented June 25, 1912.

2 SHEETS—SHEET 1.

Witnesses:
Richard Sommer
Leroy S. Hodges

Inventor
Henry Schumacher
by Geyer & Popp
Attorneys.

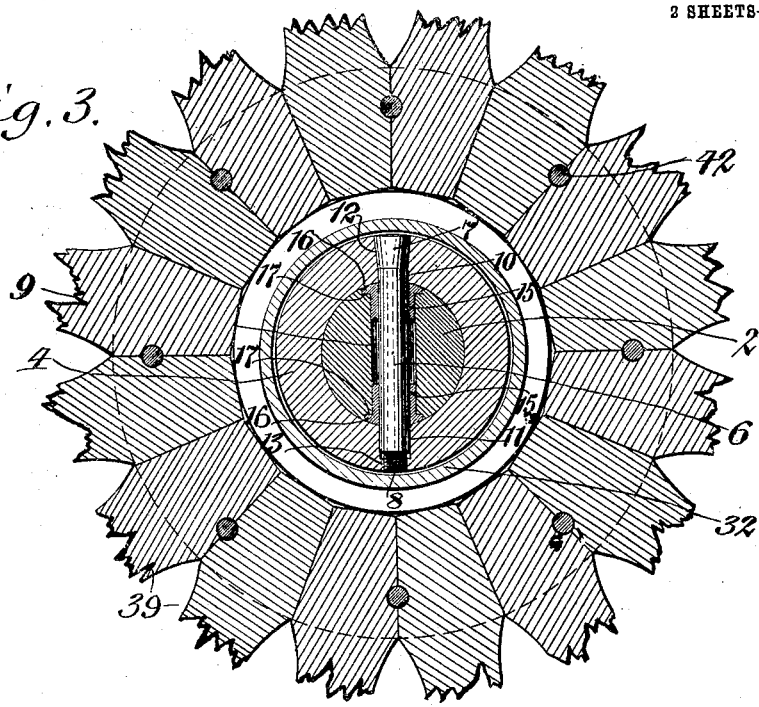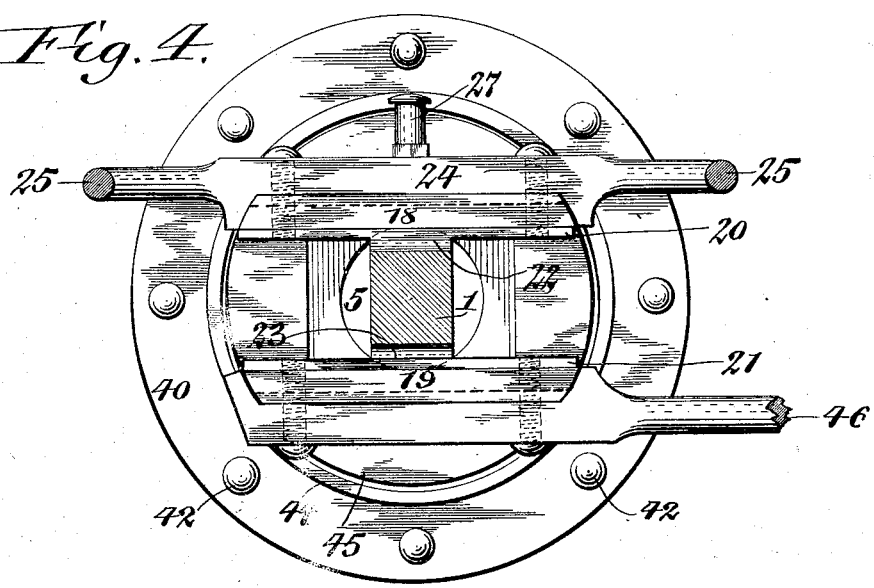

UNITED STATES PATENT OFFICE.

HENRY SCHUMACHER, OF BUFFALO, NEW YORK.

STEERING-GEAR FOR VEHICLES.

1,030,793.  Specification of Letters Patent.  Patented June 25, 1912.

Application filed August 12, 1911. Serial No. 643,699.

*To all whom it may concern:*

Be it known that I, HENRY SCHUMACHER, a citizen of the United States, residing at Buffalo, in the county of Erie and State of New York, have invented new and useful Improvements in Steering-Gears for Vehicles, of which the following is a specification.

This invention relates to a steering gear or mechanism for vehicles and more particularly to what is known as the steering knuckle of automobiles. As is well known the steering knuckles of such vehicles as now constructed form one of the most important parts of an automobile owing to the immense strain to which they are subjected and the liability of breaking the same.

It is the object of this invention to provide a knuckle for steering mechanisms of this character which is so constructed as to increase its strength and durability, which can be produced at comparatively low cost, and which can be readily assembled or dismembered.

Figure 1:
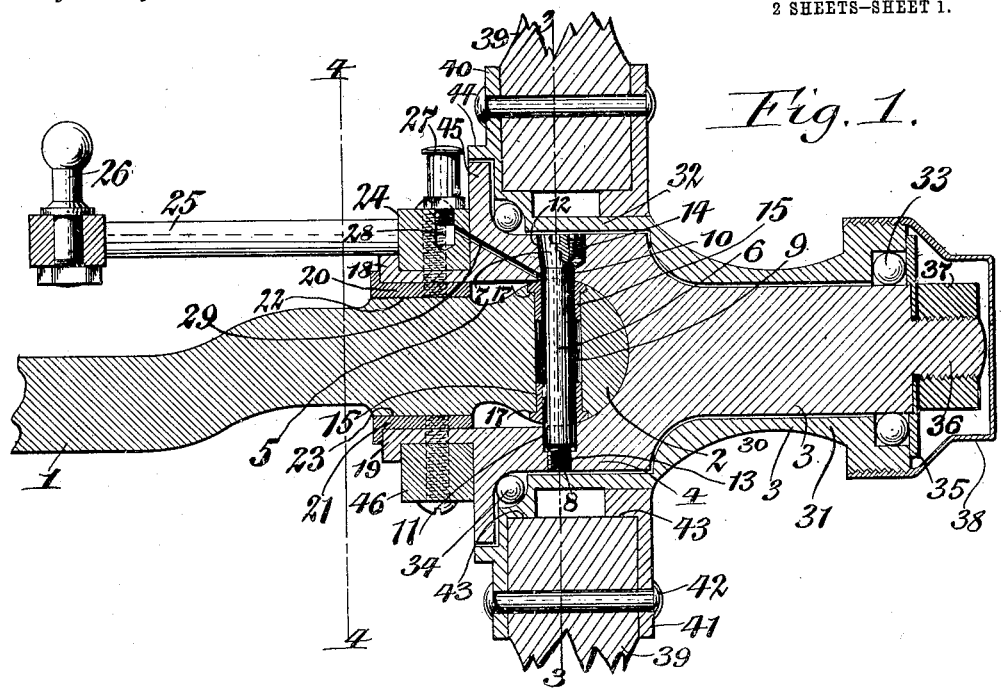
Figure 2:
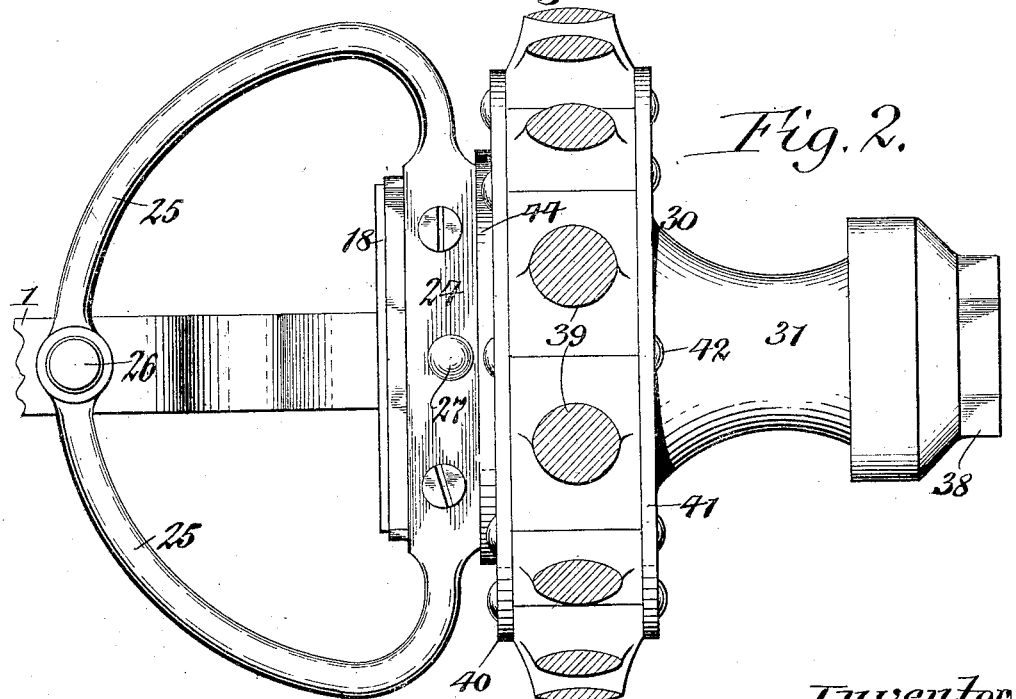

In the accompanying drawings consisting of 2 sheets: Figure 1 is a vertical longitudinal section of my improved steering knuckle applied to a wheel and axle. Fig. 2 is a top plan view thereof with the spokes of the wheel shown in section. Figs. 3 and 4 are vertical transverse sections taken in the correspondingly numbered lines in Fig. 1.

Similar characters of reference indicate corresponding parts throughout the several views.

1 represents part of the steering axle of a vehicle such as an automobile. At each end this axle is provided with a spherical knob or pivot ball 2. Upon this ball is pivotally mounted an axle arm or arbor which has a contracted outer part 3 and an enlarged inner part 4 and which is provided with a socket 5 extending axially from the inner end of the axle arm. The bottom of this socket is of semi-spherical or ball-shaped form and is engaged by the periphery of the pivot ball.

The pivot ball is held in engagement with the spherical socket of the axle arm by means of a connection which permits the axle arm to turn horizontally relatively to the ball but prevents the same from being withdrawn lengthwise therefrom. In its preferred form this connection comprises a vertical pivot pin having a cylindrical body 6, a conical head 7 at the upper end of the body and a reduced screw threaded shank 8 at the lower end of the body. The body of the connecting pivot pin is arranged in an upright diametrical opening 9 formed in the pivot ball and its upper and lower ends are seated in cylindrical parts 10, 11 of upper and lower openings formed in the adjacent parts of the axle arm above and below the ball-shaped part of the socket therein. The conical or tapering head of the pivot pin is seated in a correspondingly shaped upper part 12 of the upper opening of the axle arm and forms an upward extension of the upper cylindrical seat 10. The screw threaded shank of the pivot pin engages with the reduced screw threaded part 13 of the lower opening of the axle arm and forms a downward extension of the lower cylindrical seat 11. By this means a firm support for the pivot pin at opposite ends thereof is provided on the axle arm which affords the maximum resistance to breakage. This pivot pin may be held against loosening by various means, for instance, by means of a lock screw 14 engaging with a threaded opening formed partly in the head of the pivot pin and partly in the adjacent part of the axle arm, as shown in Fig. 1.

In order to reduce the wear upon the pivot pin and the opening of the pivot ball and thereby maintain a tight joint between the axle arm and ball the opening in the pivot ball is made of larger diameter than the body of the pivot pin and bushings 15 of bronze or other durable material are inserted into opposite ends of the pivot opening of the ball so as to receive the adjacent parts of the pivot body and form bearings therefor. The outer end of each of these bushings preferably conforms to the spherical surface of the pivot ball and bears against the socket in the axle arm and the outer end of each bushing is also enlarged, as shown at 16, and engages with a rabbet or counter bore 17 formed in the adjacent outer end of the opening of the pivot ball, whereby coöperating shoulders are formed between each bushing and the pivot ball, so that inward displacement of the bushing relatively to the ball is prevented.

In order to aid in resisting vertical displacement of the axle arm relatively to the axle and relieve the pivot pin of strains in this direction the inner end of the axle arm is provided with upper and lower horizontal flanges 18, 19 which are arranged transversely above and below the axle and which are provided on their opposing sides with horizontal bearing shoes 20, 21 engaging with bearing faces 22, 23 formed on the upper and lower sides of the axle adjacent to the inner side of the pivot ball thereof. As the axle arm turns horizontally on the axle ball, the shoes slide horizontally upon the upper and lower bearing faces of the axle and thereby aid in preventing vertical movement of the axle arm relatively to the axle proper when subjected to heavy loads or strains.

The horizontal turning movement of the axle arm may be produced by various means extending from the axle arm to the steering wheel adjacent to the operator's seat. Ordinarily this connection comprises but a single arm extending inwardly from the axle arm which construction is weak and liable to become bent or broken when subjected to heavy strains. In the present case this single arm is replaced by a duplex arm which is constructed in the form of an open frame and comprises a longitudinal bar 24 secured to the upper flange 18 at the rear or inner end of the axle arm and a bow 25 projecting horizontally inward from opposite ends of the longitudinal bar. On the central part of this bow is mounted a coupling pin 26 whereby this duplex arm is pivotally connected with a shifting rod of the mechanism leading to the operator's seat. Upon shifting the duplex arm backward or forward by means of this shifting rod the axle arm and the parts mounted thereon are turned accordingly for steering the vehicle. This construction of shifting arm is comparatively light and much stronger than the means heretofore used for shifting the axle arm, thereby increasing the safety in the operation of automobiles.

Various means may be employed for lubricating the joint between the pivot ball and axle arm but the means shown in the drawings are suitable and comprise an oil cup 27 screwed with its lower end into an opening 28 formed centrally on the longitudinal bar 24 of the duplex shifting arm, and an inclined duct 29 extending from the opening 28 through the longitudinal bar 24 and upper part of the axle arm to the upper part of the pivot pin and upper bushing, whereby oil is conducted from the oil cup to the upper end of the pivot pin and bushing and then passes downwardly to the lower end of this pivot pin and the companion bushing, thereby thoroughly lubricating these parts.

The wheel which is mounted upon the axle arm may be of any suitable construction but that shown in the drawings is preferred and constructed as follows: 30 represents a tubular hub barrel having a contracted outer part 31 which surrounds the contracted part of the axle arm and an enlarged inner part 32 which surrounds the enlarged part of the axle arm. If desired, this hub barrel may turn directly upon the axle arm but it is preferable to employ annular rows of balls 33, 34 between the adjacent outer ends of the axle arm and hub barrel and between the adjacent inner ends of the hub barrel and axle arm, as shown in Fig. 1. The hub barrel is confined on the axle arm by means of a retaining washer or disk 35 mounted on a screw threaded stem 36 at the outer end of the axle arm and projecting over the front end of the hub barrel, and a screw nut 37 applied to the screw stem and bearing against the outer side of the retaining disk 35.

Dust is excluded from the outer ball bearing by means of a cap 38 screwed onto the outer end of the hub barrel and inclosing the adjacent row of balls, retaining disk and nut.

39 represents the spokes of the wheel which are secured at their inner ends between a fixed rear annular flange 40 preferably formed integrally with the hub barrel at the rear end thereof and a removable flange or ring 41 mounted by means of a driving fit on the inner end of the enlarged part of the hub barrel. The two hub flanges and the wheel spokes between the same are connected together preferably by means of rivets 42, as shown in the drawings, although any other suitable means may be employed, if desired. The inner ends of the opposing sides of the hub flanges are provided with shoulders 43, 43 for the inner ends of the spokes to rest against, thereby increasing the supporting surface of the spokes on the hub and strengthening the wheel accordingly.

The rear flange of the hub is provided on its rear side with an annular rim 44 which projects over the periphery of a companion annular rim 45 at the rear end of the axle arm for the purpose of excluding dust and dirt from the rear ball bearing. To the underside of the axle arm flange 19 is secured a coupling arm 46 which is adapted to be pivotally connected with a similar arm on the companion axle arm for causing the same to turn together when steering the vehicle.

The spokes of the wheel are vertically in line with the pivot between the axle arm and axle thereby causing any strain to which the wheel is subjected to strike the dead center of the pivotal connection between the axle arm and axle, thereby enabling this joint to offer the maximum resistance to any force which would tend to break or destroy the same, thus increasing the safety of the steering mechanism accordingly.

I claim as my invention:

A steering gear for vehicles comprising an axle arm having a spherical socket at its inner end, an unthreaded opening arranged on the upper side of said socket and having a cylindrical lower part and a conical upper part, and an opening arranged on the lower side of said socket and having an upper unthreaded cylindrical part and a lower threaded cylindrical part which is of smaller diameter than said lower unthreaded cylindrical part, an axle having a spherical knuckle seated in said socket and having a vertical pivot opening, and an upright pivot pin having a cylindrical body which has its central part arranged in the pivot opening of the knuckle while its upper and lower ends fit the unthreaded cylindrical parts of said upper and lower openings, a conical head at the upper end of said body fitting the conical part of said upper opening, and a lower reduced threaded end engaging with the threaded part of said lower opening.

Witness my hand this 3rd day of August, 1911.

HENRY SCHUMACHER.

Witnesses:
 FRANK SCHUMACHER,
 BERNHARD W. SCHMIDT.